United States Patent
Izadpanah (10) Patent No.: US 6,240,274 B1
(45) Date of Patent: May 29, 2001

(54) HIGH-SPEED BROADBAND WIRELESS COMMUNICATION SYSTEM ARCHITECTURE

(75) Inventor: Hossein Izadpanah, Newberry Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/295,705

(22) Filed: Apr. 21, 1999

(51) Int. Cl.[7] .............................. H04B 7/24; H04J 3/04; H04L 12/28

(52) U.S. Cl. ..................... 455/39; 455/422; 370/536; 370/913; 370/916

(58) Field of Search .................... 455/42.2, 39; 370/345, 370/350, 536, 535, 416, 913

(56) References Cited

U.S. PATENT DOCUMENTS 5,751,702 * 5/1998 Evans et al. .......................... 370/314
6,014,545 * 1/2000 Wu et al. ............................... 455/3.1
6,101,174 * 8/2000 Langston .............................. 370/312

OTHER PUBLICATIONS

H. Izadpanah, "LMDS: A Broadband Wireless Access Technology: An Overview," The 3rd IAA Annual Conference on "Computers and Communications," The City University of New York, New York, Sep. 1998.

H. Izadpanah, D. Gregoire, J. Schaffner, and HP HSU, "MM–Wave Wireless Access Technolgy For The Wideband Wireless Local Loop Applications," 1998 IEEE Radio and Wireless Conference (RAWCON'98) Colorado Springs, CO, Aug. 1998.

J. Schaffner, H. Izadpanah, and HP HSU, "Millimeter Wave Wireless Technology and Testbed Development for Wideband Infrastructure Access," WCC98, San Diego, CA, Nov. 1998.

H. Izadpanah, "LMDS Technologies For Broadband Wireless Local Loop Applications," IEEE 802.16 Standard Document, published Jul. 1999.

* cited by examiner

Primary Examiner—Vivian Chang
Assistant Examiner—Charles N. Appiah
(74) Attorney, Agent, or Firm—Tope-McKay & Associates (57) ABSTRACT

Techniques and architecture as well as channel multiplexing schemes to design and implement multi-megabit and gigabit transfer of data in situations requiring or optimized by wireless communication systems are presented as a method by which the high-speed signal integrity of a transmission may be maintained over a hostile wireless link and by which a high-speed transmission may be made while maintaining a bit-rate below the delay spread value such that the unforgiving propagation conditions normally associated with high-speed transfer are mitigated. The system is adaptable to any use where a multi-megabit and gigabit wireless link is desirable; for example in office buildings lacking fiber infrastructure, in rapid deployment situations such as those required in military or emergency situations, or where other separate broadband infrastructures do not exist to the end users for integrated telephone, Internet, and digital data systems.

9 Claims, 6 Drawing Sheets

HIGH-SPEED BROADBAND WIRELESS COMMUNICATION SYSTEM ARCHITECTURE

TECHNICAL FIELD

The present invention is related to the high-speed data communications industry. More specifically, this application discloses techniques and architecture as well as new channel multiplexing techniques to design and implement high-speed data transfer in situations requiring, or optimized by, wireless communication systems. The invention is designed to provide data transfer rates from several megabits per second to multiple gigabits per second.

BACKGROUND OF THE INVENTION

Information technology advancements such as real-time multimedia applications and high-speed Internet access, as well as the integration of common communications means such as telephone, Internet, television, and digital data systems have led to an unprecedented need for high-speed data transfer. However, many segments of today's wired networks are incapable of supporting the transfer rates required by these technologies. In many cases, it is impractical, both physically and economically, to install the necessary fiber optic and other broadband infrastructures to overcome this deficiency. Furthermore, in certain circumstances such as emergencies and military operations requiring high-speed data transfer, there exists an inherent need for rapid and temporary network access deployment without a physical infrastructure Although wireless data transfer methods exist today, current technologies, including today's fastest radio modems, are limited to speeds approximating a T3 communication line, or about 45 megabits per second. Current high-speed physical transfer mediums, both optical and wired, however, are often much faster, affording data transfer rates of several gigabits per second and beyond. Consequently, segments of today's networks that are not connected with a high-speed physical transfer medium act as bottlenecks with respect to the rest of the system.

Therefore, the primary object of this invention is to provide new fixed wireless channel multiplexing techniques and system architecture to overcome these limitations and to provide a system which yields data transfer rates from several megabits per second to multiple gigabits per second.

An example of a solution in which this invention may be incorporated is discussed in the pending application titled "Wideband Wireless Access Local Loop Based on Millimeter Wave Technology" by Izadpanah, et al., attorney docket number HRL1, which is incorporated herein by reference, and which identifies how the need for greater bandwidth has created a bottleneck in user access and in approximately the first and/or last mile of many fixed wireless networks. Traditionally, Local to Multipoint Distribution Services (LMDS) and Multi-channel Multipoint Distribution Services (MMDS) have been used to overcome these bottlenecks and to deliver video programs for education and entertainment in an analog format, with broadcast radii of one to five miles, and ten to forty miles, respectively. With the increasing acceptance of digital video and video compression methods alongside the increased system capacity, the need for two-way high-bandwidth transmissions in digital form is gaining importance. Unfortunately, although current LMDS and MMDS systems are capable of offering data transmission rates of up to several gigabits per second, they are designed for one-way distribution, not for two-way broadband applications. Therefore, they fail to fulfill the need for two-way transmissions to areas where there is no suitable infrastructure. Furthermore, because of their logistical and equipment requirements, they are designed for permanent emplacements and are of no use whatsoever in applications requiring rapid, wireless deployment.

In contrast, the present invention may be configured to provide a two-way broadband data transfer method, including a rapidly deployable and relatively low cost system architecture along with new channel multiplexing techniques for the provision of high-speed wireless data transfer links. This architecture is designed for implementation with minimal infrastructure requirements. Configured with the necessary supporting architecture, this system provides a means to overcome the transmission difficulties associated with current fixed wireless technologies. See e.g.:

1. H. Izadpanah, et al, "MM-Wave Wireless Access Technology For The Wideband Wireless Local Loop Applications," presented at the 1998 IEEE Radio and Wireless Conference (RAWCON'98), Colorado Springs, Colo., August 1998.
2. H. Xu, et al, "The Sliding Correlator And Network Analyzer Channel Sounding Methods For Wideband Multipath Propagation Measurements At 5.85 GHz," *Advancing Microwaves*- 1998 *Special Wireless Issue*, Volume 25, No. 3, June 1998, pp. 17–27.

The system of the present invention may be configured in a manner such that it may deliver data to a fixed single user, or multiple users, at aggregate/peak gigabit per second rates.

SUMMARY OF THE PRESENT INVENTION

In accordance with the present invention, techniques and architecture, as well as new channel multiplexing techniques to design and implement multi-megabit and gigabit per second transfer of data in situations requiring or optimized by wireless communication systems are presented. This invention serves as a method by which the signal integrity of a high bit-rate data transmission may be maintained over a hostile wireless link and by which a high-speed transmission may be made while maintaining a bit-rate below the threshold imposed by the delay spread value such that the unforgiving propagation conditions normally associated with high-bit rate transfer are mitigated. In the operation of a transmitting portion, a high-speed serial digital signal is demultiplexed into a series of parallel sub-rate channels, each allowing for a lower bit-rate transmission. The series of parallel sub-rate channels are then modulated onto carrier frequencies, generated as the harmonics of a local oscillator frequency. After modulation, the analog parallel channels are combined, up-converted, amplified and broadcast. This process is reversed in a receiving portion, regenerating the original high-speed serial digital signal. The system described herein is adaptable to any use where a high-bit rate wireless link is desirable; for example, in office buildings lacking sufficient fiber infrastructure, in rapid deployment situations such as those required in military or emergency situations, or in places where other separate infrastructures for integrated broadband services do not exist to the end users.

DETAILED DESCRIPTION

The present invention relates to a high-bit rate data transfer architecture and systems incorporating it therein. The following description is presented to enable one of ordinary skill in the art to make and use the invention, which may be incorporated in the context of a variety of applications. Various modifications to the preferred embodiment, as well as a variety of uses in different applications will be readily apparent to those skilled in the art. Notably, the general principles defined herein may be applied to other embodiments; thus, the present invention is not intended to be limited to the embodiments shown, but is to be accorded the widest scope consistent with the principles and novel features disclosed herein.

Figure 1:
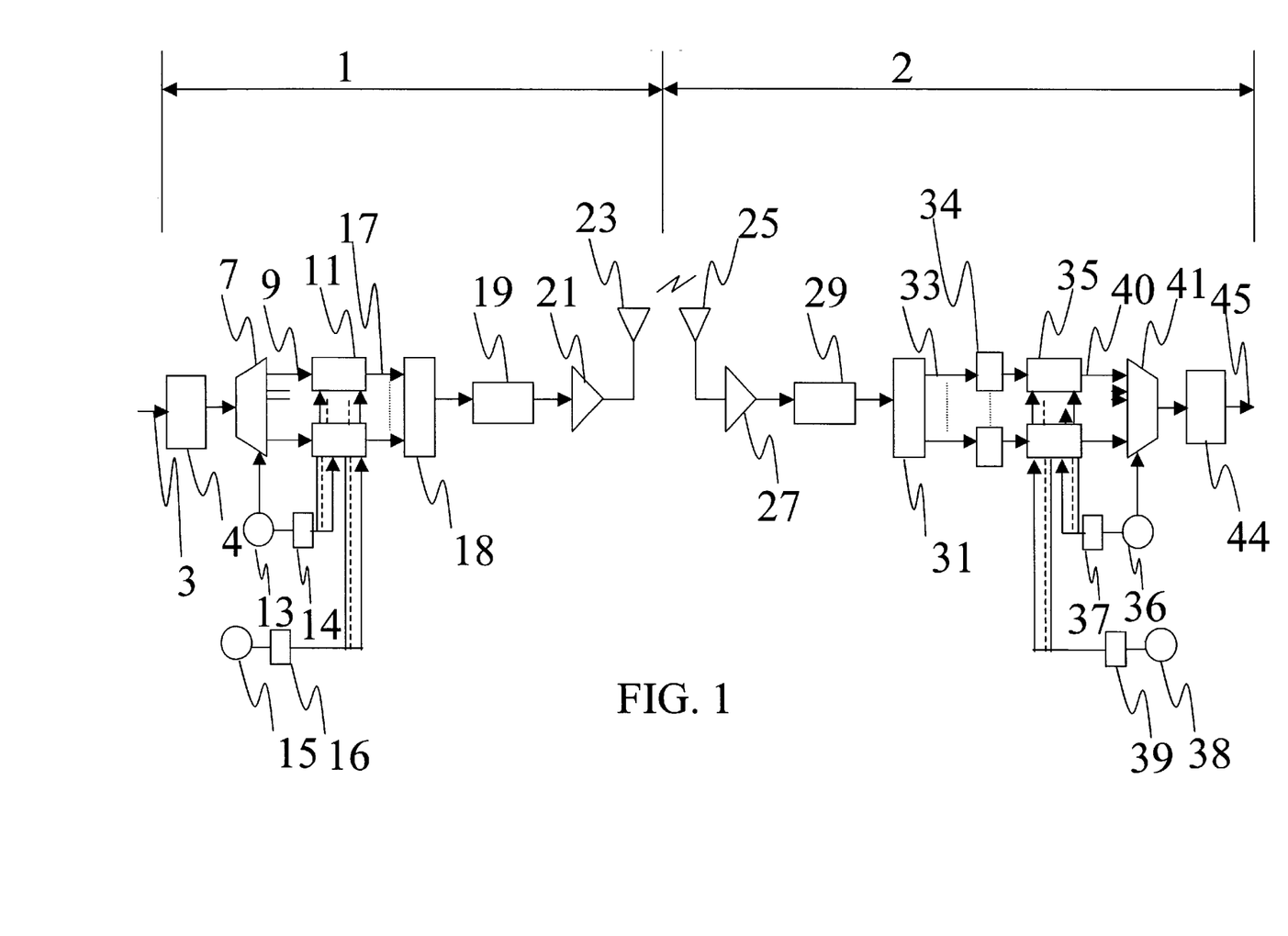
FIG. 1 provides a functional block diagram of the architecture of the preferred embodiment of the broadband radio terminals of the invention.

A functional block diagram of the preferred embodiment of the high-frequency radio terminal of the invention and its various components is shown in FIG. 1. As shown, the high-frequency radio terminal includes a transmitting portion 1 and a receiving portion 2. Although only one transmitting portion 1 and one receiving portion 2 are shown in the figure, it is possible to have more than one of either for a given application and to combine them into transmitting/receiving portions to facilitate two-way data transfer. In operation, a high bit-rate serial data transmission from a high bit-rate data transfer means, such as a broadband fiber optic cable 3, e.g. a signal from a synchronous optical network (SONET) or a signal in asynchronous transfer mode (ATM) format, is received and converted into a conventional electrical signal by an optical to electrical converter/demodulator 4. The high bit-rate electrical serial signal is then passed to a demultiplexer 7, the operation of which is controlled by a master clock 13. The signal is demultiplexed into N parallel sub-rate digital channels 9. The resulting channels 9 are then applied to a bank of individual modems 11, utilizing such methods as quadrature phase shift keying (QPSK) or quadrature amplitude modulation (QAM), on radio frequency (RF) carriers. Each individual modem of the bank of individual modems 11 is synchronized by a clock signal from a divider 14 which divides the frequency of the master clock 13 by N. The frequency of the master RF local oscillator 15 is N times multiplied by the harmonic generator 16 to generate a series of N equally spaced carrier frequencies to be applied to the modems 11. Prior to modulation, a header is added to each of the channels, containing channel number, data sequence number, and synchronization information. The number N is chosen as a constant integer and has the same value for all parts of the high frequency radio terminal. Furthermore, the precise value of N is selected to facilitate the desired operating bit-rate per channel in view of the carrier frequencies used and the bit-rate of the incoming digital multiplexed signal from the high bit-rate data transfer means. Thus, at this point, the initial de-multiplexed high bit-rate serial data burst which was received has been assembled into a group of lower bit-rate parallel data bursts with N time-stretched bit intervals, each including a header with the information required to re-assemble them into the original multiplexed high bit-rate serial data transmission burst at a later point in time in the receiving portion 2. The modulated N parallel sub-rate analog signals 17 are then combined by a combiner 18 and up-converted to a higher radio frequency, normally millimeter wave bands, by an up-converter 19 in preparation for transmission. The signal is then passed through an amplifier 21 to increase the signal power for transmission and applied to the transmitting antenna 23 to be launched through the air. The signal is then received in the receiving portion 2 by the receiver antenna 25 and is then passed through a low-noise amplifier 27 before being down-converted into an intermediate frequency by a down converter 29. After down-conversion, the signal is split, by a splitter 31, back into the original, N parallel sub-rate analog channels 33, each of which include the channel, sequence, and synchronization information with which they were sent. The individual N parallel sub-rate analog channels are then filtered for their individual sub-carrier frequencies by a bank of N channel filters 34. Next, the filtered individual N parallel sub-rate analog channels are applied to a bank of individual modems 35, utilizing methods such as quadrature phase shift keying (QPSK) or quadrature amplitude modulation (QAM), on radio frequency (RF) carriers. Each individual modem of the bank of individual modems 35 is synchronized by a clock signal from the divider 37 which the frequency of the master clock 36 by N. The frequency of the master RF local oscillator 38 is N times multiplied by the harmonic generator 39 to generate a series of N equally spaced carrier frequencies to be applied to the modems 35. Subsequent to modulation, the sub-rate header information is used to recover the original ordered N digital channels. The channels are then passed to a multiplexer 41 controlled by the master clock 36 to reconstruct the original high bit-rate serial signal. At this point, the N digital channels have been re-assembled into the original signal, thereby reversing the process that took place in the transmitting portion 1. After the original high bit-rate conventional electrical signal is regenerated, it is typically converted into an optical signal by an electrical to optical converter/modulator 44 and passed along a broadband fiber optic cable 45. Although broadband fiber optic cable is used as the high bit-rate data transfer means in the embodiments presented herein, the inventors appreciate that other high bit-rate data transfer means may be substituted with appropriate conversion means to provide an electrical or other signal type useful with the particular equipment chosen for use with the transmitting portion 1 and receiving portion 2. Preferably, the high-frequency millimeter wave transmitters and receivers as well as free-space laser communication are operational for transmitting and receiving high bit-rate signals. Additionally, they may be configured to transmit and receive signals of a frequency band specifically fitted to a particular application.

Figure 2:
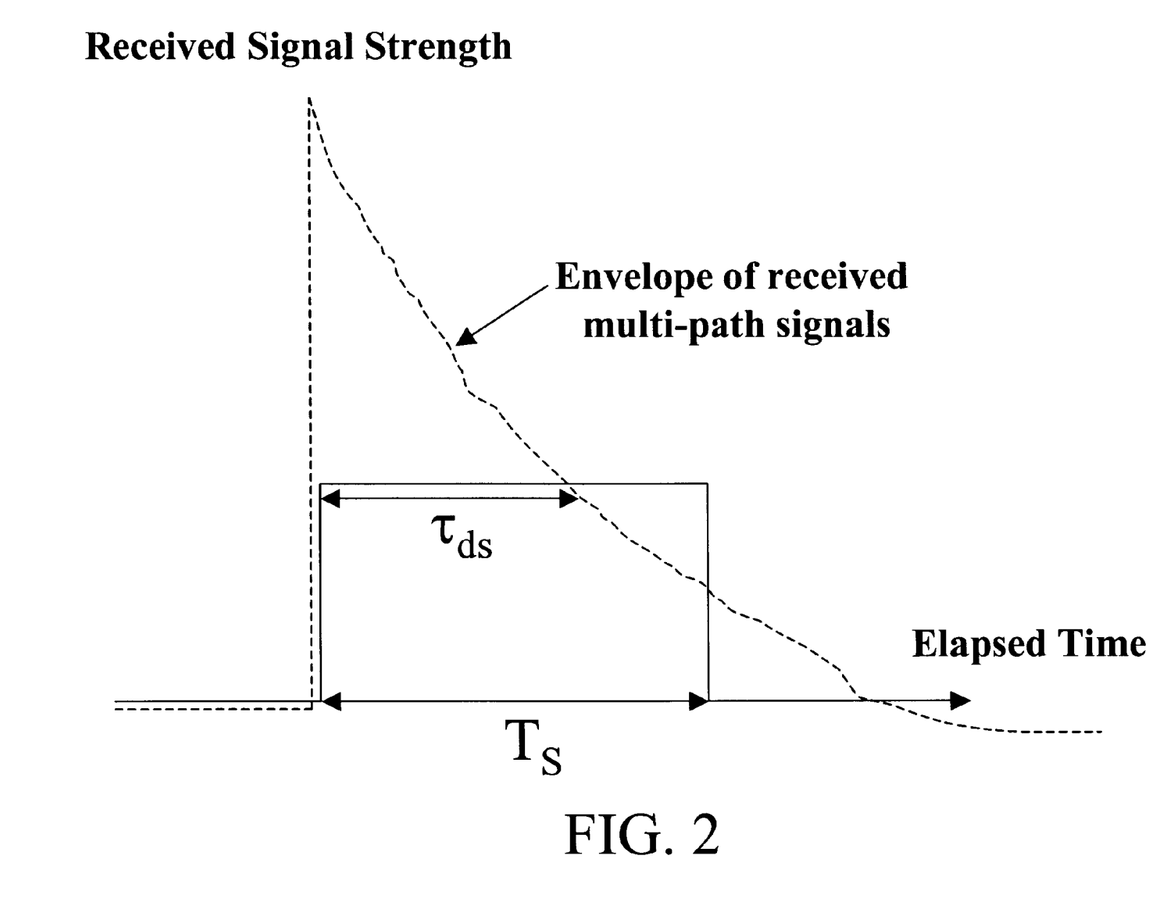
FIG. 2 provides a diagram illustrating the typical wireless propagation impairments and limitations.

FIG. 2 graphically demonstrates the typical wireless propagation impairments and limitations related to echoes and multipath, wherein multiple signals originating from the same transmitter, but following different transmission paths, are received. The associated multipath dispersion, or mean (average) delay spread $\tau_{ds}$, must be shorter than the transmitted symbol time $T_s$ to prevent interference with next bit of data. As the data transfer rate of a given channel increases the symbol (bit) time decreases causing a shorter bit cell and symbol period which results in a greater chance of intersymbol interference. In FIG. 2, it is readily apparent that the bit cell and symbol period $T_s$ must be greater than or just equal the average delay $\tau_{ds}$ in the period shown such that the detected signal is error-free. This is necessary to prevent delays in the frequency components associated with each bit transition from interfering with the frequency components associated with the sampled portion of a later bit. An increase in the number N of sub-rate channels such that the corresponding increased bit cell period is greater than the average delay $\tau_{ds}$ avoids the incorrect interpretation of the received signal.

Figure 3:
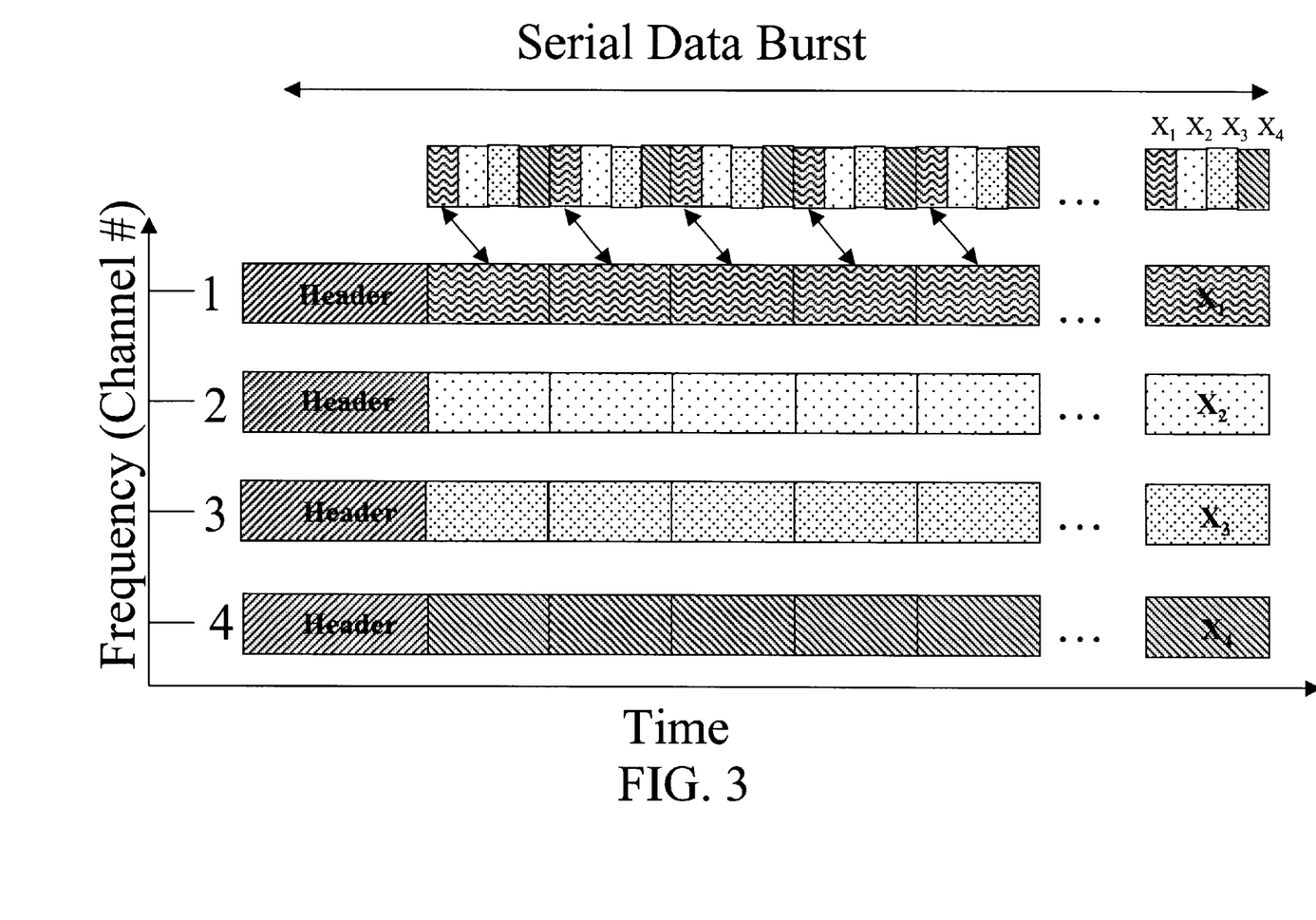
FIG. 3 is an illustration showing the operation of the present invention in the assembly of a series of N parallel lower speed data bursts with header information from a single serial high-speed data bit stream.

In order to provide for high bit-rate data transmission, this invention utilizes a digital time-division-multiplexing/demultiplexing scheme as shown in FIG. 3 in order to stretch the bit time of a serial data burst into a number N of parallel sub-rate signals, each on a separate frequency channel. As shown, each of the N parallel sub-rate signals includes a sub-rate header with channel, sequence, and synchronization information as previously discussed relative to FIG. 1. The N parallel sub-rate signals provide means by which the bit intervals from the original serial data burst are effectively stretched in order to eliminate intersymbol interference related to the small symbol period required for transmission at the serial bit frequency. For illustration in FIG. 3 the serial data burst has been stretched onto four channels, thus providing a bit cell period four times that of the serial data burst. Although four-bit packets are stretched in FIG. 3 for illustration purposes, the number N bits per packet, which are stretched orthogonally onto N channels may be chosen to suit a particular bit-rate and application.

Figure 4:
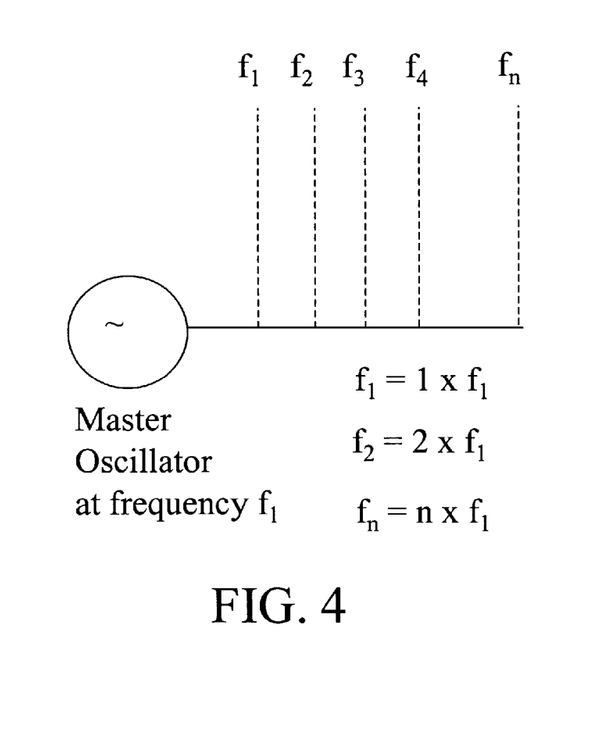
FIG. 4 is a demonstration of the relationship between the master oscillator RF frequency $f_1$, and the sub-carrier channel frequencies.

A demonstration a possible synchronization method is shown in FIG. 4. Here, the sub-carrier frequencies are shown as equally spaced harmonics of a master oscillator frequency $f_1$. In order to utilize this synchronization method, the master oscillator of the transmitting portion and the master oscillator of the receiving portion (see FIG. 1) both 5 operate on the same frequency, which acts as the fundamental frequency from which the equally spaced sub-carrier frequencies are derived. Therefore, each of the sub-carriers is a harmonic $f_n = \times f_1$, of the master oscillator frequency and is synchronized to a single source. The pattern by which the harmonic frequencies $f_n$ are assigned to particular parallel sub-rate signals after division from the original serial signal is used both in the transmitting portion and in the receiving portion to ensure that the serial signal is accurately reproduced in the receiving portion.

Figure 5:
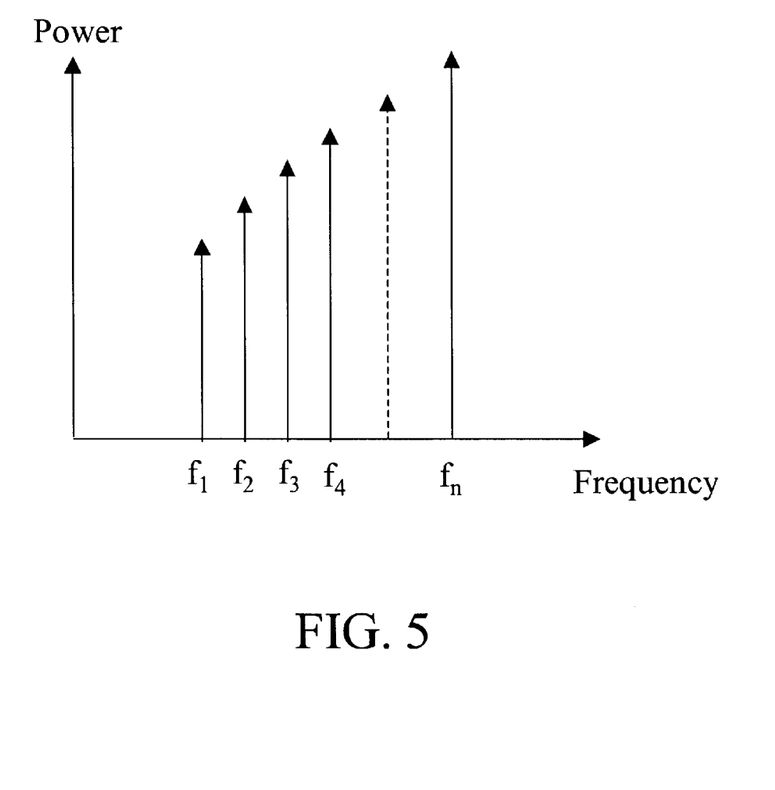
FIG. 5 is a demonstration of the increased power gain requirements for each additional sub-carrier frequency to mitigate un-equal propagation loss.
Figure 6:
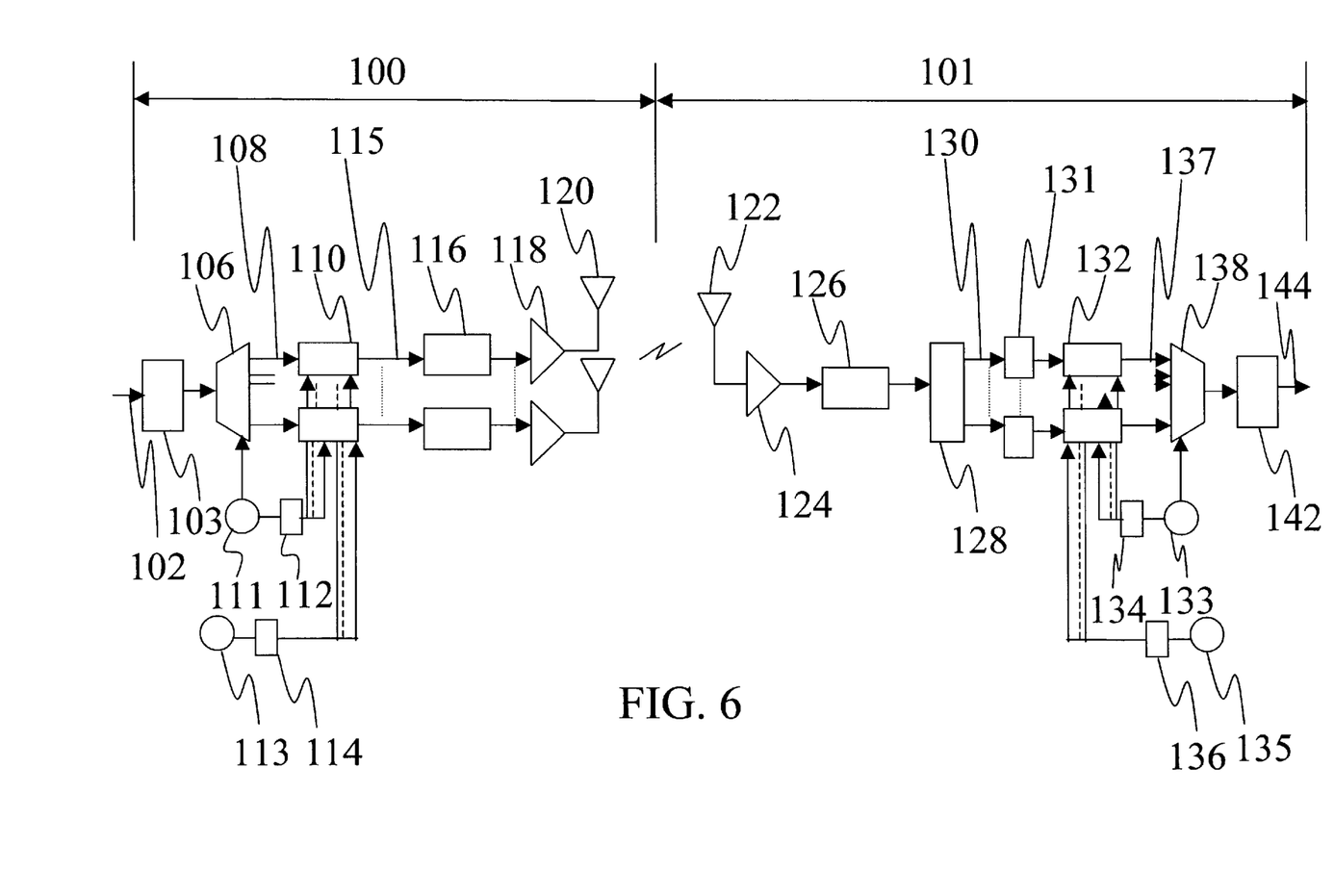
FIG. 6 is a functional block diagram of the architecture demonstrating the use of the preferred embodiment of the broadband radio terminal of the invention with an antenna array configuration for the transmitter.

The RF synchronization method concept used in this embodiment is shown in FIG. 4. In general, during propagation the higher frequency sub-carriers suffer from greater signal attenuation than the lower frequency sub-carriers. Accordingly, it is desirable to amplify each of the frequencies utilized with a different gain to compensate for un-equal attenuation as necessary to ensure accurate signal transmission for each particular application A general demonstration of the increased power compensation scheme for each additional sub-carrier frequency is shown in FIG. 5. Because the free-space propagation loss of a given radio wave varies directly with its carrier frequency, it is desirable to provide a power increase across the sub-carrier frequencies $f_n$. Thus, the final power amplifier employed in the transmitting portion must be highly linear and provide equal gain across its amplifying band pass. In practice, however, power amplifiers do not have a flat frequency response across their amplifying pass band, and hence, have a lower gain for sub-carriers of higher frequencies. Hence, it is proposed herein, to provide a power compensation technique by which all of the sub-carriers received at the receiving end have equal power. As an example of a method by which to overcome the unevenness caused by unequal amplification and unequal propagation loss, it is proposed that the RF power of the sub-carriers be amplified in a ramp-up manner during the modulation process. Another example of a method sufficient to provide even amplification to overcome the unequal propagation loss is provided in FIG. 6 and 7, in which the sub-carrier combining takes place after transmission, with each sub-carrier being individually amplified prior to transmission by and independent amplifier in a bank of amplifiers the gain of which can be individually adjusted to compensate the unequal propagation loss.

The use of sub-carrier frequencies scheme shown in FIG. 4 can also be used for bandwidth on demand wherein different data transfer capabilities are assigned to a single user depending the number of sub-rate channels allocated to that user. It is proposed as a means by which bi-directional, high bit-rate delivery network capacity and bandwidth may fully utilize the available bandwidth on the carrier frequency to serve different user with different bandwidth requirements. An example would be a system designed to transmit at 200 MHz. Using four sub-carriers, the original 200 MHz signal may be divided into increments of 50 MHz per channel. For users needing more bandwidth than 50 MHz, additional channels may be activated for that user and incrementally added to enable the additional bandwidth demand to be fulfilled. Additionally, the information transfer in a bi-directional system may be carried out in an asymmetrical manner. For example, using a total transfer bandwidth of 200 MHz, a user may request a bandwidth of 150 MHz from the network to the user. Therefore, if the signal were divided into four sub-carriers of 50 MHz per channel, the user would be assigned three sub-carriers for this purpose. If the user required transmission from the user to the network, but at a lower rate than from the network to the user, the remaining 50 MHz sub-carrier could be assigned for this purpose. Thus, in this case, three 50 MHz sub-carriers, totaling 150 MHz would be assigned for transmission from the network to the user and one 50 MHz sub-carrier, totaling 50 MHz would be assigned for transmission from the user to the network. This scheme of multiple, parallel, equally spaced sub-carrier channels allows for dynamic reconfiguration and allocation of channels on demand with a total capacity potential of several gigabits per second using the network architecture proposed herein. A simple network management and control protocol operating on this architecture can provide for an optimized set of variable capacity data communication channels.

To avoid imposing very high power and highly linear requirements on a single power amplifier in the transmitting portion, multiple parallel RF paths may be provided for each of the sub-carrier signals. In such a scheme, the limitations imposed by individual amplifier power limits and by amplification non-linearity are reduced by 1/N for the N-channels. A functional block diagram demonstrating the use of the preferred embodiment of the high-frequency radio terminal of the invention with an antenna array configuration for the transmitter is presented in FIG. 6. In this embodiment, the single combiner 18, up-converter 19, amplifier 21, and antenna 23 are replaced by banks of up-converters 116, amplifiers 118, antenna 120 in the transmitting portion 100. As before, the high-frequency radio terminal includes a transmitting portion 100 and a receiving portion 101. Although only one transmitting portion 100 and one receiving portion 101 are shown in the figure, depending on the particular application, it may be desirable to have more than one of either or both portions and to combine them into transmitter/receiver portions with the appropriate equipment. In operation, a high bit-rate data transmission from a broadband fiber optic cable 102, e.g. a transmission from a synchronous optical network or a signal in asynchronous transfer mode format, is received and converted into an electrical signal by an optical to electrical converter/demodulator 103. The high bit-rate electrical serial signal is then passed to a demultiplexer 106, the operation of which is controlled by a master clock 111. The signal is demultiplexed into N parallel sub-rate digital channels 108. The resulting channels 108 are then applied to a bank of individual modems 110, utilizing such methods as quadrature phase shift keying (QPSK) or quadrature amplitude modulation (QAM), on radio frequency (RF) carriers. Each individual modem of the bank of individual modems 110 is synchronized by a clock signal from a divider 112 which divides the frequency of the master clock 111 by N. The frequency of the master RF local oscillator 113 is multiplied by the harmonic generator 114 to generate a series of N equally spaced carrier frequencies to be applied to the modems 110. Prior to modulation, a header is added to each of the channels, containing channel number, data sequence number, and synchronization information. The number N is chosen as a constant integer and has the same value for all parts of the high frequency radio terminal. Furthermore, the precise value of N is selected to facilitate the desired operating bit-rate per channel in view of the carrier frequencies used and the bit-rate of the incoming digital multiplexed signal from the high bit-rate data transfer means. Thus, at this point, the initial de-multiplexed high bit-rate serial data burst which was received from the broadband fiber optic cable 102 has been assembled into a group of lower bit-rate parallel data bursts with N time-stretched bit intervals, each including a header with the information required to re-assemble them into the original multiplexed high bit-rate serial data transmission burst at a later point in time in the receiving portion 101. Rather than being combined by a combiner (see FIG. 1), the modulated N analog sub-rate signals are directly up-converted to a higher radio frequency by a bank of up-converters 116 in preparation for transmission. The up-converted N analog sub-rate signals are then passed through a bank of amplifiers 118 to increase their signal power for transmission via a bank of antennas 120. In this embodiment, the step of sub-rate combining via hardware is cut out, and the combining is performed over the air during transmission to the receiver. The transmitted signal is then received in the receiving portion 101 by receiver antenna 122 and is then passed through a low-noise amplifier 124 before being down-converted into an intermediate frequency by a down converter 126. After down-conversion, the signal is split, by a splitter 128, back into the original N analog sub-rate channels 130, each of which includes the channel number, sequence, and synchronization information with which it was sent. The individual N parallel sub-rate analog channels are then filtered for their individual sub-carrier frequencies by a bank of N channel filters 131. Net the filtered individual N parallel sub-rate analog channels are applied to a bank of individual modems 132, utilizing methods such as quadrature phase shift keying (QPSK) or quadrature amplitude modulation (QAM), on radio frequency (RF) carriers. Each individual modem of the bank of individual modems 132 is synchronized by a clock signal from the divider 134 which the frequency of the master clock 133 by N. The frequency of the master RF local oscillator 135 is N times multiplied by the harmonic generator 136 to generate a series of N equally spaced carrier frequencies to be applied to the modems 132. Subsequent to demodulation, the sub-rate header information is used to recover the original ordered N digital channels. The channels are then passed to a multiplexer 138 controlled by the master clock 133 to reconstruct the original high bit-rate serial signal. At this point, the N digital channels have been re-assembled into the original signal, thereby reversing the process which took place in the transmitting portion 100. After demodulation, the sub-rate header information is used by the master clock to recover the original ordered N parallel sub-rate digital channels 136 before regeneration of the original high bit-rate serial signal by a multiplexer 138 in which the N parallel sub-rate digital channels are re-assembled into the original signal by N-bit packets, thereby reversing the process which took place in the transmitting portion 100. After the original high bit-rate signal is regenerated, it is typically converted into an optical signal by an electrical to optical converter/modulator 142 and passed along a broadband fiber optic cable 144. Although broadband cable is used as the high bit-rate data transfer means in the embodiments presented herein, the inventors appreciate that other high bit-rate data transfer means may be substituted with appropriate conversion means to provide an electrical or other signal useful with the particular equipment chosen for use with the transmitting portion 100 and the receiving portion 101. Preferred are the high-frequency millimeter wave or laser transmitters and receivers because they are operational for both transmitting and receiving signals. Additionally, they may be configured to transmit and receive signals of a frequency specifically fitted to a particular application.

Figure 7:
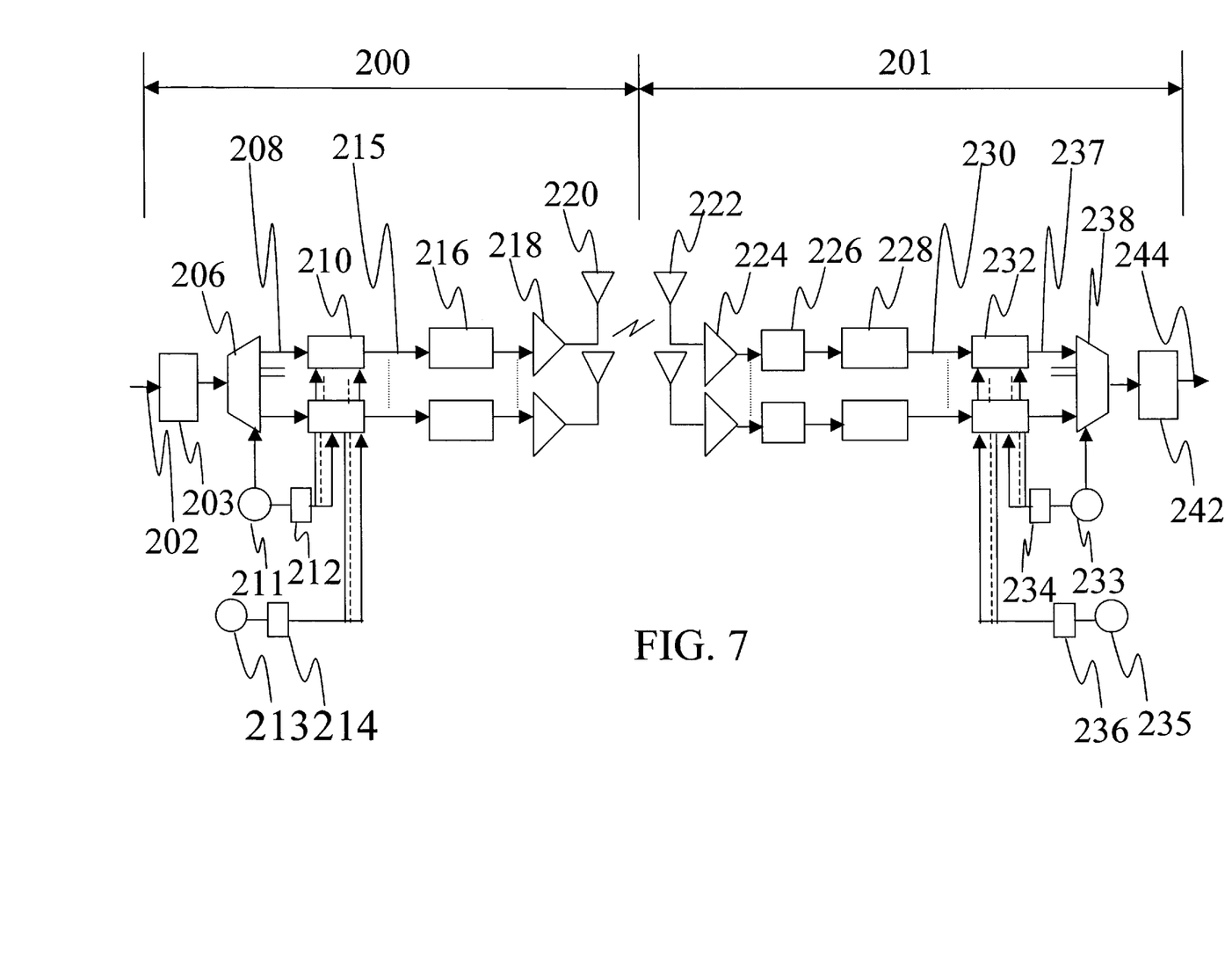
FIG. 7 is a functional block diagram of the architecture demonstrating the use of the preferred embodiment of the broadband radio terminal of the invention with antenna array configurations for both the transmitter and the receiver.

A functional block diagram demonstrating the use of the preferred embodiment of the high-frequency radio terminal of the invention with an antenna array configuration for both the transmitter and the receiver is shown in FIG. 7. In this embodiment, the transmitting portion 200 is configured as was described for FIG. 6, with parts 202, 203, 206, 208, 210, 211, 212, 213, 214, 215, 216, 218, and 220 of FIG. 7 directly corresponding to parts 102, 103, 106, 108, 110, 111, 112, 113, 114, 115, 116, 118, and 120, respectively, of FIG. 6 both in physical and functional makeup. As in the embodiment shown in FIG. 6, the sub-rate combining step is performed over the air during transmission to the receiver. In the receiving portion 201, the N high-frequency channels are received by a bank of receiving antennas 222 and are then amplified by a corresponding bank of amplifiers 224. Next, the amplified channel signals are down-converted into an intermediate frequency by a bank of down-converters 226. Then, the signals are filtered for each desired channel frequency over a bank of channel filters 228. The individual N parallel sub-rate analog channels are then applied to a bank of individual modems 232, utilizing methods such as quadrature phase shift keying (QPSK) or quadrature amplitude modulation (QAM), on radio frequency (RF) carriers. Each individual modem of the bank of individual modems 232 is synchronized by a clock signal from the divider 234 which the frequency of the master clock 233 by N. The frequency of the master RF local oscillator 235 is N times multiplied by the harmonic generator 236 to generate a series of N equally spaced carrier frequencies to be applied to the modems 232. Subsequent to demodulation, the sub-rate header information is used to recover the original ordered N digital channels. The channels are then passed to a multiplexer 238 controlled by the master clock 233 to reconstruct the original high bit-rate serial signal. At this point, the N digital channels have been re-assembled into the original signal, thereby reversing the process which took place in the transmitting portion 200. After the original high bit-rate signal is regenerated, it is converted into an optical signal by an electrical to optical converter/modulator 242 and passed along a broadband fiber optic cable 244. Although broadband fiber optic cable is used as the high bit-rate data transfer means in the embodiments presented herein, the inventors appreciate that other high bit-rate data transfer means may be substituted with appropriate conversion means to provide an electrical or other signal useful with the particular equipment chosen for use with the transmitting portion 200 and the receiving portion 201. Preferably, the high-frequency millimeter wave or free-space laser transmitters and receivers are operational for transmitting and receiving signals. Additionally, they may be configured to transmit and receive signals of a frequency specifically fitted to a particular application.

What is claimed is:

1. A broadband wireless communication system architecture including:
   a. at least one transmitting portion configured to receive a digital multiplexed serial signal from a high bit-rate data transfer means, said transmitting portions including:
      i. a transmitting portion master clock having a transmitting portion master clock frequency;
      ii. a transmitting portion frequency divider connected to the transmitting portion master clock to divide the transmitting portion master clock frequency by an integer number N to provide an N-divided transmitting portion master clock frequency;
      iii. a transmitting portion local oscillator having a transmitting portion local oscillator frequency;
      iv. a transmitting portion harmonic generator connected to the transmitting portion local oscillator to multiply the transmitting portion local oscillator frequency by an N-member series of harmonics $H_i$ to generate an N-member set of $H_i$-multiplied carrier frequencies with N selected as equal to the integer number N used in the transmitting portion frequency divider to provide the N-divided transmitting portion master clock frequency;
      v. a demultiplexer connected to the transmitting portion master clock to receive the transmitting portion master clock frequency therefrom, the demultiplexer controlled by the transmitting portion master clock frequency to demultiplex a received digital multiplexed serial signal into a plurality of N-digital parallel sub-rate channels and to add a digital header to each of the N-digital parallel sub-rate channels, the digital header including channel number, sequence, and synchronization information with N selected as equal to the integer number N used in the transmitting portion frequency divider to provide the N-divided transmitting portion master clock frequency;
      vi. a plurality N of transmitting portion modems connected to the N-way demultiplexer, each transmitting portion modem positioned to receive one of the N-digital parallel sub-rate channels therefrom, the plurality N of transmitting portion modems further connected to the transmitting portion frequency divider to receive the N-divided transmitting portion master clock frequency therefrom with the N-divided transmitting portion master clock frequency synchronizing the operation of the plurality N of the transmitting portion modems, the plurality N of transmitting portion modems further connected to the transmitting portion harmonic generator with each transmitting portion modem positioned to receive one of the series of $H_i$-multiplied carrier frequencies therefrom with the N-digital parallel sub-rate channels, the N-divided transmitting portion master clock frequency, and the $H_i$-multiplied carrier frequencies acting substantially simultaneously on the plurality of transmitting portion modems to convert the N-digital parallel sub-rate channels into N-analog parallel channels, each of the N-analog parallel channels synchronized with the other N-analog parallel channels by the N-divided transmitting portion master clock frequency and modulated onto one of the series of $H_i$-multiplied carrier frequencies with N selected as equal to the integer number N used in the transmitting portion frequency divider to provide the N-divided transmitting portion master clock frequency;
      vii. a transmitting portion combiner connected to the plurality N of transmitting portion modems to receive the N-analog parallel channels and to combine them into a combined analog signal;
      viii. a transmitting portion up-converter, connected to the transmitting portion combiner to receive the combined analog signal and to convert the combined analog signal into a higher frequency combined analog signal;
      ix. a transmitting portion amplifier connected to the transmitting portion up-converter to receive the higher frequency analog combined analog signal to increase the power of the higher frequency combined analog signal and;
      x. a transmitting antenna, connected to the transmitting portion amplifier to receive and broadcast the amplified higher frequency signal as a radio transmission;
   b. at least one receiving portion configured to send a digital multiplexed serial signal into a high bit-rate data transfer means including:
      i. a receiving antenna positioned to receive a radio transmission as a higher frequency signal;
      ii. a receiving portion amplifier connected to the receiving antenna to receive and increase the power of the higher frequency signal;
      iii. a down-converter connected to the receiving portion amplifier to receive the amplified higher frequency signal and to convert it into a lower frequency signal;
      iv. a N-way splitter connected to the down-converter to receive the lower frequency signal and to split it in a plurality N-ways into a plurality N-lower frequency signals with N selected as equal to the integer number N used in the transmitting portion frequency divider to provide the N-divided transmitting portion master clock frequency;
      v. a plurality N of frequency filters, each of the frequency filters connected to the splitter to receive an individual lower frequency signal from the plurality N-lower frequency signals and to filter the received individual lower frequency signal for a desired channel frequency selected from the individual $H_i$-multiplied carrier frequencies of the transmitting portion, the plurality N of frequency filters chosen to provide filtration of the plurality of N-lower frequency signals into the original series of N-analog parallel channels with N selected as equal to the integer number N used in the transmitting portion frequency divider to provide the N-divided transmitting portion master clock frequency;

vi. a receiving portion master clock having a receiving portion master clock frequency equal to the transmitting portion master clock frequency;

vii. a divider connected to the receiving portion master clock to divide the receiving portion master clock frequency by an integer number N to provide an N-divided receiving portion master clock frequency, with N selected as equal to the integer number N used in the transmitting portion frequency divider to provide the N-divided transmitting portion master clock frequency;

viii. a receiving portion local oscillator having a receiving portion local oscillator frequency equal to the transmitting portion local oscillator frequency;

ix. a receiving portion harmonic generator connected to the receiving portion local oscillator to multiply the local oscillator frequency by a series of harmonics $H_i$ to generate an N-member series $H_i$ of equally spaced $H_i$-multiplied carrier frequencies equal to the equally spaced $H_i$-multiplied carrier frequencies generated in the transmitting portion harmonic generator with N selected as equal to the integer number N used in the transmitting portion frequency divider to provide the N-divided transmitting portion master clock frequency;

x. a plurality N of receiving portion modems connected to the plurality N of frequency filters, each receiving portion modem positioned to receive one of the N-lower frequency signals from an individual frequency filter, the plurality N of receiving portion modems further connected to the N-way divider to receive the N-divided receiving portion master clock frequency therefrom with the N-divided receiving portion master clock frequency synchronizing the operation of the plurality N of receiving portion modems, the plurality N of receiving portion modems further connected to the receiving portion harmonic generator with each receiving portion modem positioned to receive one of the series of $H_i$-multiplied carrier frequencies therefrom, the N-lower frequency signals, the N-divided receiving portion master clock frequency, and the $H_i$-multiplied carrier frequencies acting substantially simultaneously on the plurality N of receiving portion modems to convert the N-lower frequency analog signals into N-digital parallel sub-rate channels, each of the N-digital parallel sub-rate channels synchronized with the other N-digital parallel sub-rate channels by the N-divided receiving portion master clock frequency and demodulated using one of the series of $H_i \times N$-multiplied carrier frequencies with N selected as equal to the integer number N used in the transmitting portion frequency divider to provide the N-divided transmitting portion master clock frequency and;

xi. a N-way multiplexer connected to receive the N-digital parallel sub-rate channels from the plurality of modems, the N-way multiplexer further connected to the receiving portion master clock to receive the receiving portion master clock frequency as a control signal therefrom to be used with the digital sub-rate header added by the demultiplexer of the transmitting portion to control the multiplexing of the received N-digital parallel sub-rate channels to generate a digital multiplexed serial signal, the digital multiplexed serial signal being identical to the digital multiplexed serial received in the transmitting portion from the high bit-rate data transfer means with N selected as equal to the integer number N used in the transmitting portion frequency divider to provide the N-divided transmitting portion master clock frequency.

2. A broadband wireless communication system architecture as set forth in claim 1, wherein the transmitting portion amplifier individually amplifies each of the modulated carrier frequencies with a frequency-related gain which increases with the modulated carrier frequency to minimize the frequency-related unequal propagation losses occurring at the individual sub-carrier frequencies.

3. A broadband wireless communication system architecture as set forth in claim 1, wherein the one or more members of the $H_i$-multiplied carrier frequencies may be utilized to provide variations in the allocation of transmission bandwidth between the transmitting portions and the receiving portions, whereby different users of the transmitting and receiving portions may be allocated varying bandwidth depending on their specific needs.

4. A broadband wireless communication system architecture as set forth in claim 1, wherein the transmitting portion amplifier individually amplifies each of the modulated carrier frequencies with a frequency-related gain which increases with the modulated carrier frequency to minimize the frequency-related unequal propagation losses occurring at the individual sub-carrier frequencies.

5. A broadband wireless communication system architecture as set forth in claim 1, wherein the one or more members of the $H_i$-multiplied carrier frequencies may be utilized to provide variations in the allocation of transmission bandwidth between the transmitting portions and the receiving portions, whereby different users of the transmitting and receiving portions may be allocated varying bandwidth depending on their specific needs.

6. A broadband wireless communication system architecture including:

a. at least one transmitting portion configured to receive a digital multiplexed serial signal from a high bit-rate data transfer means, said transmitting portions including:

i. a transmitting portion master clock having a transmitting portion master clock frequency;

ii. a transmitting portion frequency divider connected to the transmitting portion master clock to divide the transmitting portion master clock frequency by an integer number N to provide an N-divided transmitting portion master clock frequency;

iii. a transmitting portion local oscillator having a transmitting portion local oscillator frequency;

iv. a transmitting portion harmonic generator connected to the transmitting portion local oscillator to multiply the transmitting portion local oscillator frequency by an N-member series of harmonics $H_i$ to generate an N-member set of $H_i$-multiplied carrier frequencies with N selected as equal to the integer number N used in the transmitting portion frequency divider to provide the N-divided transmitting portion master clock frequency;

v. a demultiplexer connected to the transmitting portion master clock to receive the transmitting portion master clock frequency therefrom, the demultiplexer controlled by the transmitting portion master clock frequency to demultiplex a received digital multiplexed serial signal into a plurality of N-digital parallel sub-rate channels and to add a digital header to each of the N-digital parallel sub-rate channels, the digital header including channel number, sequence, and synchronization information with N selected as equal to the integer number N used in the transmitting portion frequency divider to provide the N-divided transmitting portion master clock frequency;

vi. a plurality N of transmitting portion modems connected to the N-way demultiplexer, each transmitting portion modem positioned to receive one of the N-digital parallel sub-rate channels therefrom, the plurality N of transmitting portion modems further connected to the transmitting portion frequency divider to receive the N-divided transmitting portion master clock frequency therefrom with the N-divided transmitting portion master clock frequency synchronizing the operation of the plurality N of the transmitting portion modems, the plurality N of transmitting portion modems further connected to the transmitting portion harmonic generator with each transmitting portion modem positioned to receive one of the series of $H_i$-multiplied carrier frequencies therefrom with the N-digital parallel sub-rate channels, the N-divided transmitting portion master clock frequency, and the $H_i$-multiplied carrier frequencies acting substantially simultaneously on the plurality of transmitting portion modems to convert the N-digital parallel sub-rate channels into N-analog parallel channels, each of the N-analog parallel channels synchronized with the other N-analog parallel channels by the N-divided transmitting portion master clock frequency and modulated onto one of the series of $H_i$-multiplied carrier frequencies with N selected as equal to the integer number N used in the transmitting portion frequency divider to provide the N-divided transmitting portion master clock frequency;

vii. a plurality N of transmitting portion up-converters, each of the plurality N of transmitting portion up-converters connected to one of the plurality N of transmitting portion modems to receive the N-analog parallel channels and to convert the N-analog parallel channels to higher frequencies with N selected as equal to the integer number N used in the transmitting portion frequency divider to provide the N-divided transmitting portion master clock frequency;

viii. a plurality N of transmitting portion amplifiers, each of the plurality N of transmitting portion amplifiers connected to one of the plurality N of transmitting portion up-converters to receive the higher frequency N-analog parallel channels and to increase the power of the higher frequency N-analog parallel channels with N selected as equal to the integer number N used in the transmitting portion frequency divider to provide the N-divided transmitting portion master clock frequency;

ix. a plurality N of transmitting antennas, each of the plurality N of transmitting antennas connected to one of the plurality N of transmitting portion amplifiers to receive the amplified higher frequency N-analog parallel channels and broadcast the amplified higher frequency signal as a radio transmission with N selected as equal to the integer number N used in the transmitting portion frequency divider to provide the N-divided transmitting portion master clock frequency;

b. at least one receiving portion configured to send a digital multiplexed serial signal into a high bit-rate data transfer means including:

i. a receiving antenna positioned to receive a radio transmission as a higher frequency signal;

ii. a receiving portion amplifier connected to the receiving antenna to receive and increase the power of the higher frequency signal;

iii. a down-converter connected to the receiving portion amplifier to receive the amplified higher frequency signal and to convert it into a lower frequency signal;

iv. a N-way splitter connected to the down-converter to receive the lower frequency signal and to split it in a plurality N-ways into a plurality N-lower frequency signals with N selected as equal to the integer number N used in the transmitting portion frequency divider to provide the N-divided transmitting portion master clock frequency;

v. a plurality N of frequency filters, each of the frequency filters connected to the splitter to receive an individual lower frequency signal from the plurality N-lower frequency signals and to filter the received individual lower frequency signal for a desired channel frequency selected from the individual $H_i$-multiplied carrier frequencies of the transmitting portion, the plurality N of frequency filters chosen to provide filtration of the plurality of N-lower frequency signals into the original series of N-analog parallel channels with N selected as equal to the integer number N used in the transmitting portion frequency divider to provide the N-divided transmitting portion master clock frequency;

vi. a receiving portion master clock having a receiving portion master clock frequency equal to the transmitting portion master clock frequency;

vii. a divider connected to the receiving portion master clock to divide the receiving portion master clock frequency by an integer number N to provide an N-divided receiving portion master clock frequency, with N selected as equal to the integer number N used in the transmitting portion frequency divider to provide the N-divided transmitting portion master clock frequency;

viii. a receiving portion local oscillator having a receiving portion local oscillator frequency equal to the transig portion local oscillator frequency;

ix. a receiving portion harmonic generator connected to the receiving portion local oscillator to multiply the local oscillator frequency by a series of harmonics $H_i$ to generate an N-member series $H_i$ of equally spaced $H_i$-multiplied carrier frequencies equal to the equally spaced Hi-multiplied carrier frequencies generated in the transmitting portion harmonic generator with N selected as equal to the integer number N used in the transmitting portion frequency divider to provide the N-divided transmitting portion master clock frequency;

x. a plurality N of receiving portion modems connected to the plurality N of frequency filters, each receiving portion modem positioned to receive one of the N-lower frequency signals from an individual frequency filter, the plurality N of receiving portion modems further connected to the N-way divider to receive the N-divided receiving portion master clock frequency therefrom with the N-divided receiving portion master clock frequency synchronizing the operation of the plurality N of receiving portion modems, the plurality N of receiving portion modems further connected to the receiving portion harmonic generator with each receiving portion modem positioned to receive one of the series of $H_i$-multiplied carrier frequencies therefrom, the N-lower frequency signals, the N-divided receiving portion master clock frequency, and the $H_i$-multiplied carrier frequencies acting substantially simultaneously on the plurality N of receiving portion modems to convert the N-lower frequency signals into N-digital parallel sub-rate channels, each of the N-digital parallel sub-rate channels synchronized with the other N-digital parallel sub-rate channels by the N-divided receiving portion master clock frequency and demodulated using one of the series of $H_i \times N$-multiplied carrier frequencies with N selected as equal to the integer number N used in the transmitting portion frequency divider to provide the N-divided transmitting portion master clock frequency and;

xi. a N-way multiplexer connected to receive the N-digital parallel sub-rate channels from the plurality of modems, the N-way multiplexer further connected to the receiving portion master clock to receive the receiving portion master clock frequency as a control signal therefrom to be used with the digital sub-rate header added by the demultiplexer of the transmitting portion to control the multiplexing of the received N-digital parallel sub-rate channels to generate a digital multiplexed serial signal, the digital multiplexed serial signal being identical to the digital multiplexed serial received in the transmitting portion from the high bit-rate data transfer means with N selected as equal to the integer number N used in the transmitting portion frequency divider to provide the N-divided transmitting portion master clock frequency.

7. A broadband wireless communication system architecture as set forth in claim 6, wherein the transmitting portion amplifier individually amplifies each of the modulated carrier frequencies with a frequency-related gain which increases with the modulated carrier frequency to minimize the frequency-related unequal propagation losses occurring at the individual sub-carrier frequencies.

8. A broadband wireless communication system architecture as set forth in claim 6, wherein the one or more members of the $H_i$-multiplied carrier frequencies may be utilized to provide variations in the allocation of transmission bandwidth between the transmitting portions and the receiving portions, whereby different users of the transmitting and receiving portions may be allocated varying bandwidth depending on their specific needs.

9. A broadband wireless communication system architecture including:
   a. at least one transmitting portion configured to receive a digital multiplexed serial signal from a high bit-rate data transfer means, said transmitting portions including:
   i. a transmitting portion master clock having a transmitting portion master clock frequency;
   ii. a transmitting portion frequency divider connected to the transmitting portion master clock to divide the transmitting portion master clock frequency by an integer number N to provide an N-divided transmitting portion master clock frequency;
   iii. a transmitting portion local oscillator having a transmitting portion local oscillator frequency;
   iv. a transmitting portion harmonic generator connected to the transmitting portion local oscillator to multiply the transmitting portion local oscillator frequency by an N-member series of harmonics $H_i$ to generate an N-member set of $H_i$-multiplied carrier frequencies with N selected as equal to the integer number N used in the transmitting portion frequency divider to provide the N-divided transmitting portion master clock frequency;
   v. a demultiplexer connected to the transmitting portion master clock to receive the transmitting portion master clock frequency therefrom, the demultiplexer controlled by the transmitting portion master clock frequency to demultiplex a received digital multiplexed serial signal into a plurality of N-digital parallel sub-rate channels and to add a digital header to each of the N-digital parallel sub-rate channels, the digital header including channel number, sequence, and synchronization information with N selected as equal to the integer number N used in the transmitting portion frequency divider to provide the N-divided transmitting portion master clock frequency;
   vi. a plurality N of transmitting portion modems connected to the N-way demultiplexer, each transmitting portion modem positioned to receive one of the N-digital parallel sub-rate channels therefrom, the plurality N of transmitting portion modems further connected to the transmitting portion frequency divider to receive the N-divided transmitting portion master clock frequency therefrom with the N-divided transmitting portion master clock frequency synchronizing the operation of the plurality N of the transmitting portion modems, the plurality N of transmitting portion modems further connected to the transmitting portion harmonic generator with each transmitting portion modem positioned to receive one of the series of $H_i$-multiplied carrier frequencies therefrom with the N-digital parallel sub-rate channels, the N-divided transmitting portion master clock frequency, and the $H_i$-multiplied carrier frequencies acting substantially simultaneously on the plurality of transmitting portion modems to convert the N-digital parallel sub-rate channels into N-analog parallel channels, each of the N-analog parallel channels synchronized with the other N-analog parallel channels by the N-divided transmitting portion master clock frequency and modulated onto one of the series of $H_i$-multiplied carrier frequencies with N selected as equal to the integer number N used in the transmitting portion frequency divider to provide the N-divided transmitting portion master clock frequency;
   vii. a plurality N of transmitting portion up-converters, each of the plurality N of transmitting portion up-converters connected to one of the plurality N of transmitting portion modems to receive the N-analog parallel channels and to convert the N-analog parallel channels to higher frequencies with N selected as equal to the integer number N used in the transmitting portion frequency divider to provide the N-divided transmitting portion master clock frequency;
   viii. a plurality N of transmitting portion amplifiers, each of the plurality N of transmitting portion amplifiers connected to one of the plurality N of transmitting portion up-converters to receive the higher frequency N-analog parallel channels and to increase the power of the higher frequency N-analog parallel channels with N selected as equal to the integer number N used in the transmitting portion frequency divider to provide the N-divided transmitting portion master clock frequency;

ix. a plurality N of transmitting antennas, each of the plurality N of transmitting antennas connected to one of the plurality N of transmitting portion amplifiers to receive the amplified higher frequency N-analog parallel channels and broadcast the amplified higher frequency signal as a radio transmission with N selected as equal to the integer number N used in the transmitting portion frequency divider to provide the N-divided transmitting portion master clock frequency;

b. at least one receiving portion configured to send a digital multiplexed serial signal into a high bit-rate data transfer means including:

i. a plurality N of receiving antennas positioned to receive a radio transmission as a higher frequency signal with N selected as equal to the integer number N used in the transmitting portion frequency divider to provide the N-divided transmitting portion master clock frequency;

ii. a plurality N of receiving portion amplifiers, each of the plurality N of receiving portion amplifiers connected to one of the plurality N of receiving antennas to receive and increase the power of the higher frequency signal with N selected as equal to the integer number N used in the transmitting portion frequency divider to provide the N-divided transmitting portion master clock frequency;

iii. a plurality N of down-converters, each of the plurality N of down-converters connected to one of the plurality N of receiving portion amplifiers to receive the amplified higher frequency signals and to convert them into lower frequency signals with N selected as equal to the integer number N used in the transmitting portion frequency divider to provide the N-divided transmitting portion master clock frequency;

iv. a plurality N of frequency flters, each of the frequency filters connected to one of the plurality of N down-converters to receive an individual lower frequency signal and to filter the received individual lower frequency signal for a desired channel frequency selected from the individual $H_i$-multiplied carrier frequencies of the transmitting portion, the plurality N of frequency filters chosen to provide filtration of the plurality of N-lower frequency signals into the original series of N-analog parallel channels with N selected as equal to the integer number N used in the transmitting portion frequency divider to provide the N-divided transmitting portion master clock frequency;

v. a receiving portion master clock having a receiving portion master clock frequency equal to the transmitting portion master clock frequency;

vi. a divider connected to the receiving portion master clock to divide the receiving portion master clock frequency by an integer number N to provide an N-divided receiving portion master clock frequency, with N selected as equal to the integer number N used in the transmitting portion frequency divider to provide the N-divided transmitting portion master clock frequency;

vii. a receiving portion local oscillator having a receiving portion local oscillator frequency equal to the transmitting portion local oscillator frequency;

viii. a receiving portion harmonic generator connected to the receiving portion local oscillator to multiply the local oscillator frequency by a series of harmonics $H_i$ to generate an N-member series $H_i$ of equally spaced $H_i$-multiplied carrier frequencies equal to the equally spaced $H_i$-multiplied carrier frequencies generated in the transmitting portion harmonic generator with N selected as equal to the integer number N used in the transmitting portion frequency divider to provide the N-divided transmitting portion master clock frequency;

ix. a plurality N of receiving portion modems connected to the plurality N of frequency filters, each receiving portion modem positioned to receive one of the N-lower frequency signals from an individual frequency filter, the plurality N of receiving portion modems further connected to the N-way divider to receive the N-divided receiving portion master clock frequency therefrom with the N-divided receiving portion master clock frequency synchronizing the operation of the plurality N of receiving portion modems, the plurality N of receiving portion modems firther connected to the receiving portion harmonic generator with each receiving portion modem positioned to receive one of the series of $H_i$-multiplied carrier frequencies therefrom, the N-lower frequency signals, the N-divided receiving portion master clock frequency, and the $H_i$-multiplied carrier frequencies acting substantially simultaneously on the plurality N of receiving portion modems to convert the N-lower frequency signals into N-digital parallel sub-rate channels, each of the N-digital parallel sub-rate channels synchronized with the other N-digital parallel sub-rate channels by the N-divided receiving portion master clock frequency and demodulated using one of the series of $H_i \times N$-multiplied carrier frequencies with N selected as equal to the integer number N used in the transmitting portion frequency divider to provide the N-divided transmitting portion master clock frequency and;

x. a N-way multiplexer connected to receive the N-digital parallel sub-rate channels from the plurality of modems, the N-way multiplexer further connected to the receiving portion master clock to receive the receiving portion master clock frequency as a control signal therefrom to be used with the digital sub-rate header added by the demultiplexer of the transmitting portion to control the multiplexing of the received N-digital parallel sub-rate channels to generate a digital multiplexed serial signal, the digital multiplexed serial signal being identical to the digital multiplexed serial received in the transmitting portion from the high bi-trate data transfer means with N selected as equal to the integer number N used in the transmitting portion frequency divider to provide the N-divided transmitting portion master clock frequency.

* * * * *

UNITED STATES PATENT AND TRADEMARK OFFICE
CERTIFICATE OF CORRECTION

PATENT NO. : 6,240,274 B1
APPLICATION NO. : 09/295705
DATED : May 29, 2001
INVENTOR(S) : Hossein Izadpanah It is certified that error appears in the above-identified patent and that said Letters Patent is hereby corrected as shown below:

Column 5, line 45, the formula reading "$f_n = xf_1$" should read --$f_n = nxf_1$--.

Signed and Sealed this

Fifteenth Day of January, 2008

JON W. DUDAS
*Director of the United States Patent and Trademark Office*